US012577126B2

(12) United States Patent
Minami

(10) Patent No.: US 12,577,126 B2
(45) Date of Patent: Mar. 17, 2026

(54) METHOD FOR PRODUCING NICKEL PARTICLES, METHOD FOR PRODUCING NICKEL SULFATE, AND METHOD FOR PRODUCING POSITIVE ELECTRODE ACTIVE MATERIAL FOR SECONDARY BATTERIES

(71) Applicant: Panasonic Intellectual Property Management Co., Ltd., Osaka (JP)

(72) Inventor: Hiroshi Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 980 days.

(21) Appl. No.: 17/275,403

(22) PCT Filed: Jul. 26, 2019

(86) PCT No.: PCT/JP2019/029396
§ 371 (c)(1),
(2) Date: Mar. 11, 2021

(87) PCT Pub. No.: WO2020/066262
PCT Pub. Date: Apr. 2, 2020

(65) Prior Publication Data
US 2022/0048790 A1 Feb. 17, 2022

(30) Foreign Application Priority Data
Sep. 26, 2018 (JP) ................................. 2018-180215

(51) Int. Cl.
*C01G 53/10* (2006.01)
*B22F 9/08* (2006.01)
(Continued)

(52) U.S. Cl.
CPC .............. *C01G 53/10* (2013.01); *B22F 9/082* (2013.01); *C01G 53/04* (2013.01);
(Continued)

(58) Field of Classification Search
None
See application file for complete search history.

(56) References Cited

U.S. PATENT DOCUMENTS 3,769,002 A * 10/1973 O'Neill ................... C22B 23/02
75/627
4,080,126 A 3/1978 Clark et al.
(Continued)

FOREIGN PATENT DOCUMENTS

CN 101542781 A 9/2009
CN 105945294 A 9/2016
(Continued)

OTHER PUBLICATIONS

English Translation of Chinese Search Report dated Sep. 5, 2022, issued in counterpart CN application No. 201980053955.4. (3 pages).
(Continued)

*Primary Examiner* — Yun Qian
(74) *Attorney, Agent, or Firm* — WHDA, LLP

(57) ABSTRACT

A process for producing nickel particles comprises the steps of: melting a nickel source to produce a melt; and powderizing molten nickel contained in the melt by an atomization method comprising atomizing a gas or an aqueous medium onto the melt, thereby producing nickel particles having purity of 90% or more. In the production process, it is also possible to melt a metal that is more likely to be oxidized than nickel together with the nickel source and then remove an oxide of the metal which is produced as the result of the melting.

6 Claims, 1 Drawing Sheet

(51) Int. Cl.

| | |
|---|---|
| *C01G 53/04* | (2006.01) |
| *H01M 4/04* | (2006.01) |
| *H01M 4/525* | (2010.01) |
| *H01M 4/02* | (2006.01) |

(52) U.S. Cl.

CPC ......... *H01M 4/0471* (2013.01); *H01M 4/525* (2013.01); *B22F 2009/0828* (2013.01); *B22F 2301/15* (2013.01); *C01P 2006/40* (2013.01); *C01P 2006/80* (2013.01); *H01M 2004/028* (2013.01)

(56) References Cited

U.S. PATENT DOCUMENTS

| | | | | |
|---|---|---|---|---|
| 2007/0251351 | A1* | 11/2007 | Akimoto | B22F 9/30 |
| | | | | 75/363 |
| 2015/0307955 | A1* | 10/2015 | Hietala | C22B 23/043 |
| | | | | 205/583 |
| 2016/0304992 | A1 | 10/2016 | Kurata et al. | |
| 2017/0324080 | A1 | 11/2017 | Tuduki et al. | |
| 2018/0071826 | A1* | 3/2018 | Nakaseko | B22F 9/08 |

FOREIGN PATENT DOCUMENTS

| | | | |
|---|---|---|---|
| CN | 107004831 A | 8/2017 | |
| JP | S53-072768 A | 6/1978 | |
| JP | H05-195024 A | 8/1993 | |
| JP | 2009-519192 A | 5/2009 | |
| JP | 5510623 B1 | 6/2014 | |
| JP | 2015-059253 A | 3/2015 | |
| JP | 2017-186661 A | 10/2017 | |
| WO | 2007/056041 A2 | 5/2007 | |
| WO | 2016/084346 A1 | 6/2016 | |
| WO | WO-2016157762 A1 * | 10/2016 | B22F 9/02 |

OTHER PUBLICATIONS

International Search Report dated Oct. 15, 2019, issue in counterpart Application No. PCT/JP2019/029396. (2 pages).

* cited by examiner

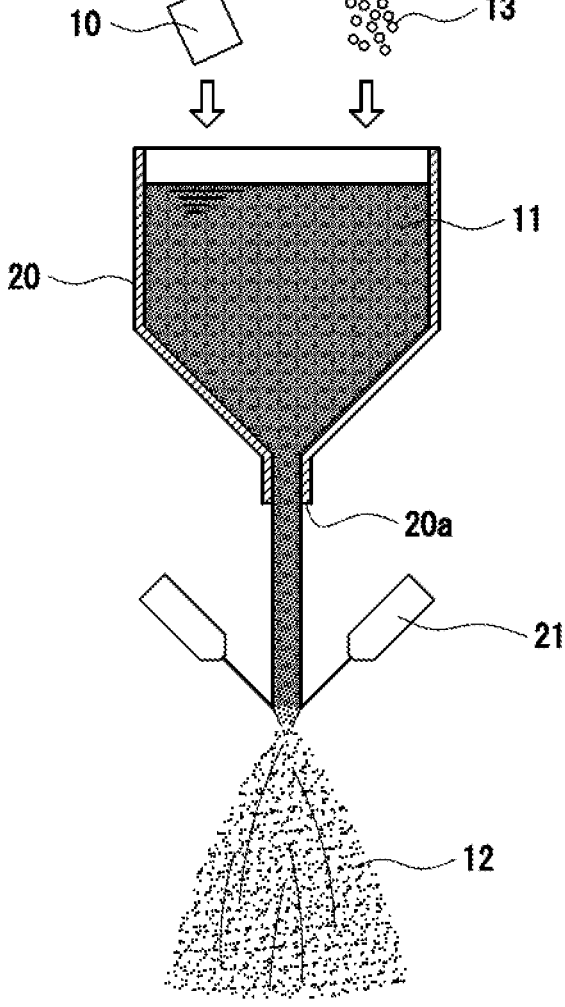

METHOD FOR PRODUCING NICKEL PARTICLES, METHOD FOR PRODUCING NICKEL SULFATE, AND METHOD FOR PRODUCING POSITIVE ELECTRODE ACTIVE MATERIAL FOR SECONDARY BATTERIES

TECHNICAL FIELD

The present disclosure relates to a method for producing nickel particles, a method for producing nickel sulfate, and a method for producing a positive electrode active material for a secondary battery.

BACKGROUND ART

Electric vehicles (xEV) such as electric cars and hybrid cars are greatly expected as a measure for fuel regulation and for environmental preservation, and an increase in amount of production of electric vehicles is expected from now on. It is assumed that production of secondary batteries such as lithium ion batteries used as power sources also increases therewith. For positive electrode active materials of the secondary batteries, composite oxides such as lithium nickel cobalt manganate (NCM) and lithium nickel cobalt aluminate (NCA) containing nickel are used (for example, refer to PATENT LITERATURE 1).

Composite oxides containing nickel can be commonly produced by producing a hydroxide containing nickel by crystallization using a nickel salt such as nickel sulfate or nickel nitrate, then mixing a lithium compound with the hydroxide, and firing the mixture at high temperature. Since a nickel salt is obtained by dissolving a nickel metal with high purity in sulfuric acid or the like, a nickel metal easily dissolved in an acid such as sulfuric acid is preferably used for producing a positive electrode active material.

CITATION LIST

Patent Literature

PATENT LITERATURE 1: International Publication No. WO 2016/084346

SUMMARY

However, if the production of secondary batteries increases from now on, it is predicted that there will be difficulties in obtaining a nickel metal suitable for a raw material of positive electrode active materials. It is an advantage of the present disclosure to provide a method for producing a nickel metal (nickel particles) suitable for a raw material of positive electrode active materials for secondary batteries.

A method for producing nickel particles which is one aspect of the present disclosure comprises: a step of melting a nickel source to obtain a molten metal; and a step of powdering molten nickel included in the molten metal by atomization in which gas or an aqueous medium is sprayed on the molten metal, thereby obtaining nickel particles having a purity of 90% by mass or more.

In a method for producing nickel sulfate which is one aspect of the present disclosure, nickel particles produced by the above-mentioned production method are dissolved in an aqueous sulfuric acid solution to obtain nickel sulfate.

A method for producing a positive electrode active material for a secondary battery which is one aspect of the present disclosure comprises: a step of obtaining a hydroxide containing nickel by crystallization using the nickel sulfate produced by the above-mentioned production method; and a step of mixing the hydroxide and a lithium compound and firing the mixed particles.

According to a method for producing nickel particles which is one aspect of the present disclosure, nickel particles suitable for a raw material of positive electrode active materials for secondary batteries may be produced.

BRIEF DESCRIPTION OF DRAWING

FIG. 1 is a drawing for illustrating a method for producing nickel particles which is an example of an embodiment.

DESCRIPTION OF EMBODIMENTS

As mentioned above, it is an important problem in the production of secondary batteries to secure a nickel metal suitable for a raw material of positive electrode active materials. Now, briquets obtained by subjecting nickel particles to compression molding and platy cathodes mainly exist as nickel metals with high purity which can be used for a raw material of positive electrode active materials. Since the solubility of briquets in sulfuric acid is higher as compared with cathodes, briquets are preferably used for producing positive electrode active materials. However, the production of briquets is limited. When the amount of production of secondary batteries increases from now on, it is predicted that briquets will be difficult to obtain. Although the amount of production of cathodes is larger than the amount of production of briquets, the rate of dissolution in an acid such as sulfuric acid is slow, and it is not easy to produce a positive electrode active material efficiently while fully utilizing cathodes.

Therefore, a novel technique for producing a nickel metal suitable for a raw material of a positive electrode active material or a technique for processing a nickel cathode to efficiently produce a positive electrode active material have been desired. The surface area of a raw material is effectively increased by powdering or pelletization to increase the rate of the dissolution of a nickel cathode in sulfuric acid. However, when a nickel, cathode is pulverized fusing a pulverizer, the pulverized nickel is contaminated with impurities derived from the device due to high strength of the cathode, and the quality (purity) deteriorates. Thus, processing a cathode is not easy.

The present inventors have intensively examined the above-mentioned problem and consequently found that a nickel source was micronized by spraying gas or an aqueous medium on a molten metal obtained by melting the nickel source, and nickel particles with high purity can be produced. Since the nickel particles has high solubility in an acid such as sulfuric acid, the nickel particles are suitable for a raw material of a positive electrode active material. The above-mentioned cathode can be used for the nickel source.

A method for producing nickel particles which is an example of an embodiment of the present disclosure, a method for producing nickel sulfate, and a positive electrode active material for a secondary battery using the nickel particles will be described in detail with reference to a drawing hereinafter. FIG. 1 is a drawing for illustrating an example of a method for producing nickel particles.

As illustrated in FIG. 1, a process for producing nickel particles 12 which is an example of an embodiment includes a step of melting a nickel source 10 to obtain a molten metal 11 (hereinafter occasionally referred to as "first step") and a step of powdering molten nickel included in the molten metal 11 by atomization in which gas or an aqueous medium is sprayed on the molten metal 11 (hereinafter occasionally referred to as "second step"). A melting furnace 20 for melting the nickel source 10, nozzles 21 for spraying high-pressure gas or a high-pressure aqueous medium on the molten metal 11, and a chamber for storing powdered nickel particles 12 (not shown) are used for the present production process.

In the present embodiment, a nickel cathode is used as the nickel source 10. A nickel, plate (starting sheet) is used as a cathode, and nickel is electrodeposited on the surface thereof to obtain a nickel cathode. A nickel cathode is a plate having a thickness of, for example, 5 mm to 15 mm, and is referred to as electric, nickel. As mentioned above, a cathode is difficult to dissolve in an acid such as sulfiric acid, and is unsuitable as a raw material of a positive electrode active material as it is. A nickel cathode is used for the nickel source 10 and powdered to obtain the nickel particles 12 which have high purity and high solubility in an acid and are suitable for a raw materials of a positive electrode active material.

However, the nickel source 10 is not limited to a nickel cathode. For example, a nickel metal with low purity such as ferronickel or nickel pig iron (NPI), an ore containing nickel, or the like may be used for the nickel source 10. A hydrate such as crude nickel hydroxide or a raw material having a positive electrode mixture separated from recycled secondary batteries and concentrated as a main component may be used.

The nickel source 10 is melted in the melting furnace 20 to give the molten metal 11 containing molten nickel. For example, an induction furnace is used for the melting furnace 20. The melting furnace 20 heats the nickel source 10 to at least a temperature equal to or higher than the melting point of nickel, and chops (drains) the molten metal 11 from a tap hole 20a provided at the bottom. Slag (impurities) which floats on the molten metal 11 retained in the melting furnace 20 is preferably removed in the first step of obtaining the molten metal 11. A heat resistant ceramic a material for preventing the contamination with impurities is preferably used for the material of the inside wall of the melting furnace 20. A the ceramic material, at least one selected from $SiO_2$, $Al_2O_3$, $MgO_2$, and $ZrO_2$ particularly preferable.

In the present production process, a metal 13 which is more likely to be oxidized than nickel may be melted together with the nickel source 10, and the penetrated oxide of the metal 13 may be removed. The metal 13 is preferably fed to the inciting furnace 20 together with the nickel source 10. The use of the metal 13 enables suppression of the oxidation of nickel since the metal 13 is oxidized preferentially over nickel in the first step. For example, since the oxide of the metal 13 floats on the molten metal 11 stored in the melting furnace 20, the oxide can be separated from the molten metal 11 containing molten nickel.

A metal located below nickel in the Ellingham diagram of oxides is preferably used for the metal 13. Specific examples of the metal include chromium (Cr), manganese (Mn), silicon (Si), titanium (Ti), aluminum (Al), magnesium (Mg), calcium (Ca), and iron (Fe). Among them, Cr, Mn, Si, Ti, Al, and Mg are preferable, which are less likely to affect the battery characteristics or the safety even when they contaminate a battery. These function as a deoxidizing material; they react with dissolved oxygen to form oxides, which suppresses the oxidation of nickel.

The molten metal 11 obtained in the first step and including molten nickel chains out of the tap hole 20a, and is fed to the second step. The molten metal 11 may be at a temperature equal to or higher than the melting point of nickel. However, since the molten metal 11 is subjected to certain cooling until the molten metal 11 is micronized by atomization, the temperature of the molten metal 11 is preferably a temperature wherein a sharp increase in the viscosity of the molten metal 11 or the like does not occur in view of the cooling. The content of the molten nickel in the molten metal 11 which chains out of the tap hole 20a is, for example, substantially 100% (the molten metal 11≅the molten nickel).

As illustrated in FIG. 1, the nozzles 21 which inject gas or an aqueous medium are provided blow the tap hole 20a. As the pressure of the gas of the aqueous medium injected from the nozzles 21 becomes higher, shearing force which acts on the molten metal 11 generally becomes larger, and the size of the nickel particles 12 becomes smaller. The nozzles 21 preferably inject high-pressure gas or a high-pressure aqueous medium obliquely downward, and high-pressure gas or a high-pressure aqueous medium is preferably substantially uniformly sprayed on the whole periphery of the molten metal 11 which falls from the tap hole 20a. For example, the nozzles 21 are concentrically disposed so as to surround the falling molten metal 11.

In the second step, as above-mentioned, the molten nickel is powdered by spraying high-pressure gas or a high-pressure aqueous medium on the molten metal 11 which falls from the tap hole 20a, thereby obtaining the nickel particles 12. The method for spraying gas on the molten metal 11 and powdering the molten metal 11 is generally referred to as gas atomization. Meanwhile, the method using an aqueous medium is generally referred to as water atomization. Inert gas such as argon, helium, or nitrogen is used for the gas. According to gas atomization, the surface oxidation of nickel particles 12 is easily suppressed as compared with general water atomization. Atomization is performed, for example, in the air atmosphere or an inert gas atmosphere such as argon.

In water atomization in which the molten metal 11 is powdered by spraying the aqueous medium on the molten metal 11, the productivity is higher and the nickel particles 12 having a small particle size is easily produced as compared with gas atomization. The aqueous medium is, for example, high-pressure water having a water pressure of 90 MPa or more. By spraying high-pressure water on the molten metal 11 (molten nickel), the molten nickel solidifies rapidly, and at the same time nickel particles 12 having a small particle size are obtained by large shearing force. According to water atomization, slurry in which the nickel particles 12 are dispersed in water is obtained and stored in the chamber. The slurry may be filtered to collect the nickel particles 12, and the nickel particles 12 may be subjected to treatments such as water washing, drying, crushing, and classification.

When water atomization is applied in the second step, the aqueous medium may be water including a surfactant. The surface oxidation of the nickel particles 12 can be suppressed using high-pressure water including a surfactant. The concentration of the surfactant is, for example, 0.01 to 5% by mass or 0.05 to 1% by mass based on the mass of the aqueous medium. The surfactant may be any of an anionic surfactant, a cationic surfactant, and a nonionic surfactant, and is preferably a nonionic surfactant.

The aqueous medium may be an aqueous sulfuric acid solution. In this case, the surface oxidation of the nickel particles 12 can be also suppressed in the same way as when the surfactant is used. When the aqueous sulfuric acid solution is used, for example, the nickel particles 12 are dispersed in the aqueous sulfuric acid solution to give slurry in which the nickel particles 12 are partially dissolved. In this case, the shiny can be used as nickel sulfate to be used for producing a positive electrode active material by adjusting the concentration as appropriate without the need for solid-liquid separation of the slurry. The concentration of sulfuric acid is, for example, 0.05 to 5 mol/L or 0.1 to 1 mol/L based on the mass of the aqueous medium.

The whole amount of the obtained nickel particles 12 may be dissolved in the aqueous sulfuric acid solution, or the obtained nickel particles 12 may be only partially dissolved as mentioned above. When undissolved nickel particles 12 exist, an aqueous sulfuric acid solution may be added in a subsequent step to dissolve the whole amount of the nickel particles 12. When an aqueous sulfuric acid solution is used for water atomization, the nickel particles 12 are dissolved in the aqueous sulfuric acid solution from immediately after water atomization, resulting in decreased particle size of the nickel particle 12. The nozzle diameter of the tap hole 20a can therefore be increased, leading to enhanced productivity.

The median size by volume of the nickel particles 12 is preferably 500 μm or less, and particularly preferably 100 μm or less in view of improved solubility in an acid, etc. The median size by volume of the nickel particles 12 is a particle size wherein the volume integrated value is 50% in the particle size distribution measured by laser diffraction scattering, and is referred to as a 50% particle size (D50) or a median diameter. The particle size of the nickel particles 12 can be controlled by the viscosity of the molten metal 11 which falls from the tap hole 20a, the pressure of gas or an aqueous medium injected from the nozzles 21, and the like. The oxygen concentration of the particle surface of the nickel particles 12 is 10% or less, preferably 6% or less, and more preferably 3% or less.

The purity of the nickel particles 12 is 90% by mass or more. That is, the content of nickel is 90% by mass or more based on all the components included in the nickel particles 12. The nickel particles 12 having a purity of 90% by mass or more are suitable as a raw material of the positive electrode active material. Metallic elements such as Si, Ti, Fe, Mg and Al, oxides thereof, and the like may be contained in an amount of less than 5% by mass, and oxygen may be contained in an amount of less than 3% by mass in the nickel particles 12. The nickel particles 12 includes, for example, 98% by mass or more of metallic components. The content of nickel among the metallic components included in the nickel particles 12 is particularly preferably 98% by mass or more. The nickel particles 12 are preferably substantially free of lanthanum (La) as an impurity The positive electrode active material for a secondary battery can be produced using the nickel particles 12 obtained by the above-mentioned production method. The nickel particles 12 are first dissolved in an aqueous sulfuric acid solution to obtain nickel sulfate. The concentration of sulfuric acid is, for example, 3 to 15 mol/L. Since the nickel particles 12 are small particles having a small particle size, the nickel particles 12 has high solubility in an aqueous sulfuric acid solution, and therefore nickel sulfate can be produced easily using the nickel particles 12.

A process for producing a positive electrode active material includes a step of obtaining a hydroxide containing nickel by crystallization using nickel sulfate and a step of mixing the hydroxide and a lithium compound and firing the mixed particles. When an aqueous sulfuric acid solution is used in water atomization, nickel sulfate can be prepared by adding an aqueous sulfuric acid solution to the shiny, or the like, without the need for solid-liquid separation of the shiny of the nickel particles 12 stored in the chamber. In water atomization using an aqueous sulfuric acid solution, the nickel particles 12 may be dissolved in an aqueous sulfuric acid solution completely to obtain nickel sulfate.

The positive electrode active material is a composite oxide containing lithium (Li) in addition to nickel (Ni) and further containing metallic elements such as cobalt (Co), manganese (Mn), and aluminum (Al). The composite oxide may additionally contain Mg, Ti, Cr, Fe, copper (Cu), zinc (Zn), gallium (Ga), strontium (Sr), zirconium (Zr), niobium (Nb), indium (In), tin (Sn), tantalum (Ta), tungsten (W), boron (B), vanadium (V), and the like. When a composite oxide containing Li, Ni, Co, and Mn (NCM) is produced, nickel cobalt manganese hydroxide is produced by coprecipitation using nickel sulfate, cobalt sulfate, and manganese sulfate.

The positive electrode active material is obtained by mixing a hydroxide containing at least Ni (for example, nickel cobalt manganese hydroxide) and a lithium compound, firing the mixed particles at a temperature of 500 to 1000° C. and then pulverizing and classifying the fired product. An example of the lithium compound is lithium carbonate. The D50 of the positive electrode active material is, for example, 1 μm to 30 μm, and preferably 3 μm to 10 μm.

EXAMPLES

Although the present disclosure will be further described by Examples hereinafter, the present disclosure is not limited to these Examples.

Example 1

A nickel cathode having 101.6 mm square was fed to a high frequency induction furnace and melted at a temperature of 1600° C. The molten nickel was drained (dropped) from the induction furnace and powdered by water atomization in which high-pressure water is sprayed on the molten nickel to obtain nickel particles having a D50 of 100 μm. The surfaces of the nickel particles were observed through a scanning electron microscope (SEM) and composition analysis was performed by energy dispersive X-ray spectroscopy (EDS) to reveal that the oxygen concentration of the particle surfaces was 6% by mass.

Example 2

Nickel particles having a D50 of 100 μm were obtained in the same manner as in Example 1 except that 0.1% by mass of Si was fed to an induction furnace based on a nickel cathode, and oxides floating on the surface of the molten nickel were removed as slag. In this case, the oxygen concentration of the particle surfaces was 3% by mass.

Example 3

Treatment was performed in the same manner as in Example 1 except that an aqueous sulfuric acid solution (0.3 mol/L) was used instead of water in water atomization. In this case, an aqueous sulfuric acid solution in which the whole amount of nickel particles was dissolved (aqueous solution of nickel sulfate) was obtained.

Example 4

Nickel particles having A D50 of 100 μm were obtained in the same manner as in Example 1 except that an aqueous 0.1% by mass nonionic surfactant solution was used instead of water in water atomization. In this case, the oxygen concentration of the particle surfaces was 1.5% by mass.

As mentioned above, according to the above-mentioned production method, nickel particles which have high purity and high solubility in an acid such as sulfuric acid, and are suitable for a raw material of a positive electrode active material can be produced using a nickel source such as a nickel cathode. A nickel raw material having a low oxygen concentration on the particle surfaces and higher purity can be obtained especially by feeding a metal which is more likely to be oxidized than Ni, such as Si, to the molten metal (Example 2) and the use of water including a surfactant as an aqueous medium in water atomization (Example 4). When an aqueous sulfuric acid solution was used as an aqueous medium (Example 3), the whole amount of the nickel particles was dissolved in an aqueous sulfuric acid solution to thereby obtain nickel sulfate.

REFERENCE SIGNS LIST 10 nickel source
11 molten metal
12 nickel particles
13 metal
20 melting furnace
20a tap hole
21 nozzle

The invention claimed is:

1. A method for producing nickel particles, comprising:
a step of melting a nickel source to obtain a molten metal; and
a step of powdering molten nickel included in the molten metal by atomization in which gas or an aqueous medium is sprayed on the molten metal, thereby obtaining nickel particles having a purity of 90% or more,
wherein the nickel source is a nickel cathode,
the method further comprising:
prior to the step of melting, a step of adding a metal to the nickel source, the metal being at least one selected from the group of chromium (Cr), manganese (Mn), silicon (Si), titanium (Ti), aluminum (Al), magnesium (Mg), and calcium (Ca),
wherein the metal is melted together with the nickel source during the step of melting, and
after the step of melting, a step of removing a generated oxide of the metal from the molten metal,
wherein in the step of melting, the molten metal is contained in a melting furnace having an outlet at a lower side thereof, and
the step of removing is performed by discharging the molten metal from the outlet of the melting furnace while causing the generated oxide of the metal to float on the molten metal in the melting furnace.

2. The method for producing nickel particles according to claim 1, wherein the atomization is water atomization in which the aqueous medium is used, and the aqueous medium is water including a surfactant or an aqueous sulfuric acid solution.

3. The method for producing nickel particles according to claim 1, wherein nickel constitutes 98% by mass or more of all metallic components included in the nickel particles.

4. The method of producing nickel particles according to claim 1, wherein the aqueous medium is water including a surfactant.

5. The method of producing nickel particles according to claim 1, wherein gas is sprayed on the molten metal in the step of powdering.

6. The method for producing nickel particles according to claim 1, wherein the metal added to the nickel source is at least one selected from the group of chromium (Cr), manganese (Mn), titanium (Ti), and magnesium (Mg).

* * * * *